March 15, 1932.   G. A. MITCHELL   1,849,880
FILM MOVEMENT
Filed April 25, 1930   4 Sheets-Sheet 1

Inventor
George A. Mitchell.
Attorney.

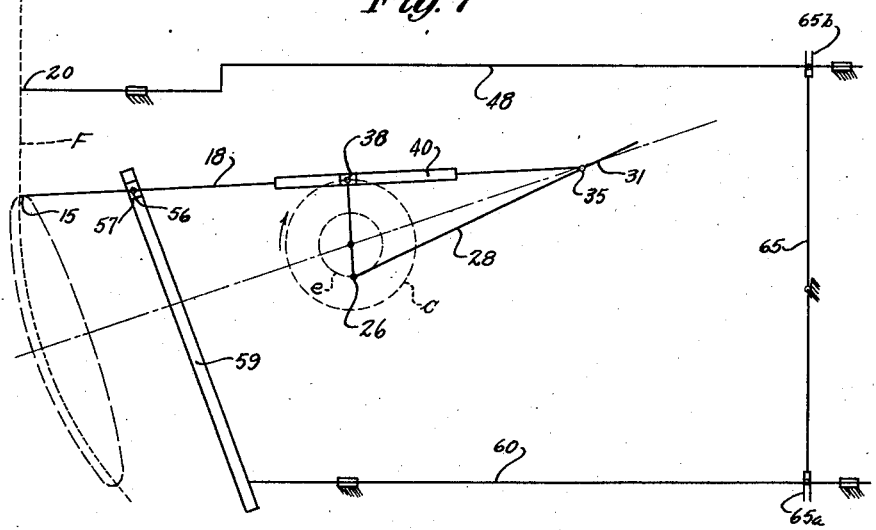
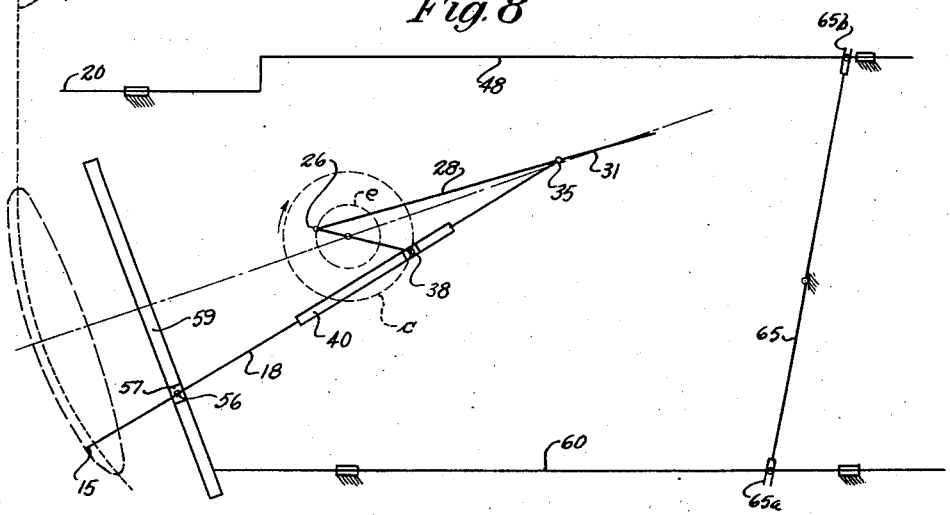

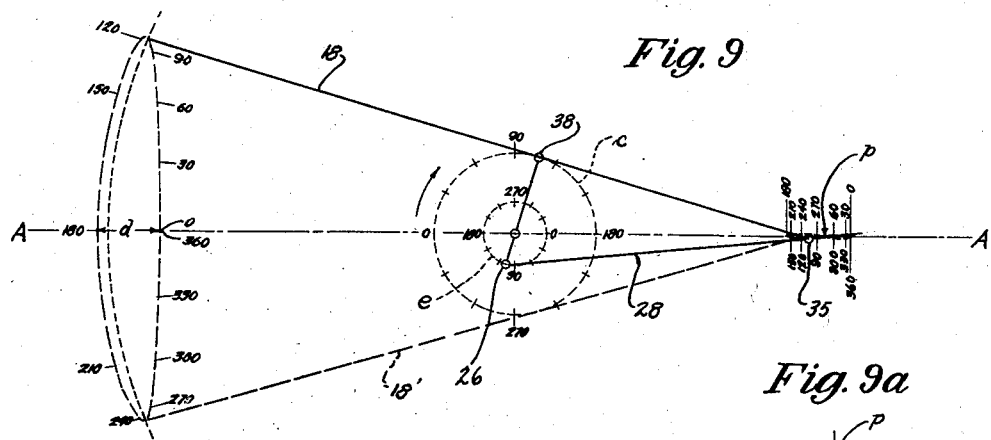
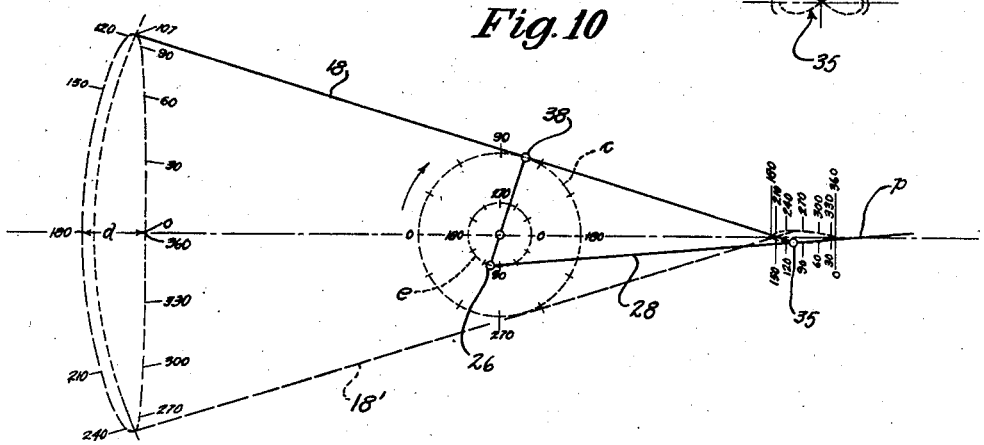
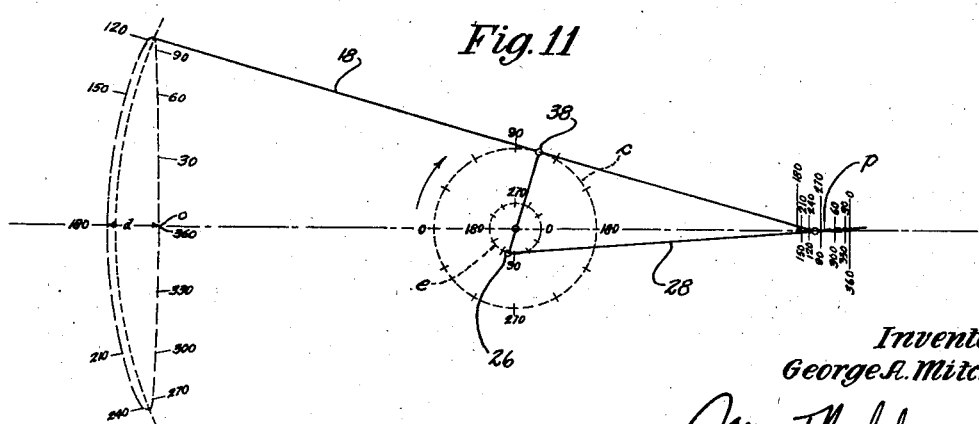

March 15, 1932. G. A. MITCHELL 1,849,880
FILM MOVEMENT
Filed April 25, 1930 4 Sheets-Sheet 4
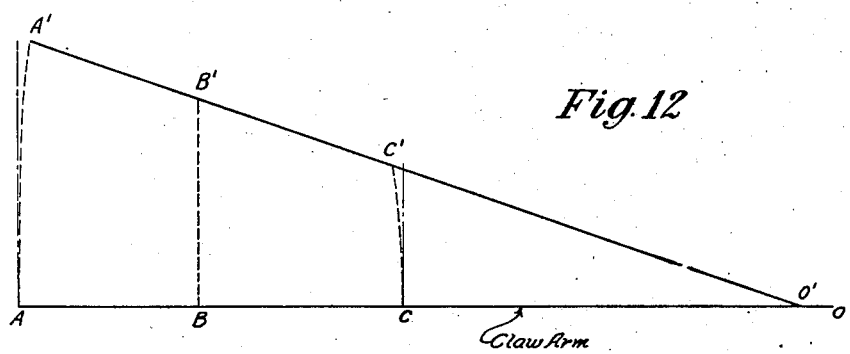
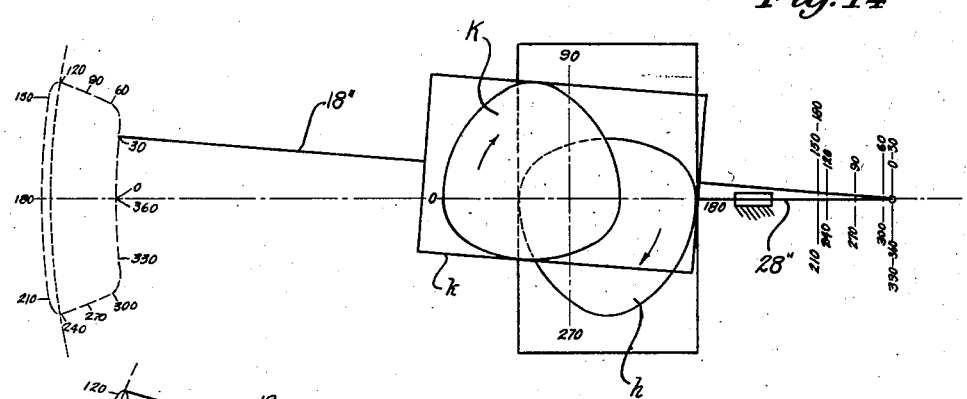
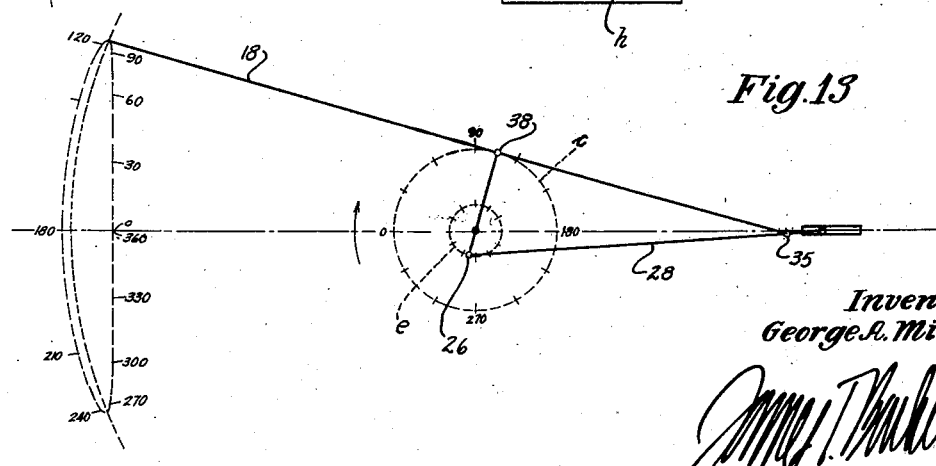
Inventor
George A. Mitchell.
Attorney.

Patented Mar. 15, 1932

1,849,880

UNITED STATES PATENT OFFICE

GEORGE A. MITCHELL, OF LOS ANGELES, CALIFORNIA, ASSIGNOR TO MITCHELL CAMERA CORPORATION, OF WEST HOLLYWOOD, CALIFORNIA, A CORPORATION OF DELAWARE

FILM MOVEMENT

Application filed April 25, 1930. Serial No. 447,294.

This invention relates generally to intermittent movement mechanisms, and more particularly to intermittent film movements for motion picture cameras and the like.

The movement of the present invention is of the general type embodying an oscillative claw arm operable intermittently to engage and pull down the film, and film holding mechanism operable on the film alternately with the claw arm to hold the film in proper register with the exposure aperture while not being moved by the claw arm.

It is an object of the present invention, in one aspect, to provide a simple film movement mechanism characterized by extreme quietness of operation.

To this end a preferred design and arrangement is provided with a particular view toward avoidance of inherent noise producing parts, this design embodying a single drive shaft for both the film moving and the film holding means, and employing eccentrics or cranks for the operation of the claw arm in place of noiser cams, as used in a number of well known prior movements.

In another aspect, it is an object of the invention to provide a simple intermittent film movement mechanism characterized by certain desired motion characteristics with reference to the film and its movement, such as straight in and out movements in engaging and disengaging the film, a fast "pulldown" and a long "dwell" for the film, and by such characteristics as a straight rather than a looping back-path movement, etc.

In the accomplishment of the latter objects, eccentrics or cranks may be preferable to cams for the operation of the claw arm in certain situations where quietness is a controlling requirement, although in other cases cams may be equally as well suited or even preferable due to characteristic motion paths obtainable with their use. In the specific illustrative embodiment herein detailed an eccentric and a crank are relied upon for the operation of the claw arm, but it will be explained in the course of the specification how these may in certain cases be interchanged or substituted for by cams. One of the outstanding characteristics of the invention, however, is in this: That it provides a movement and mechanism of such character that cranks or eccentrics can be used (although not necessarily) and a fast pull down and long dwell still be obtained.

It is a further object of the invention to provide a simple film movement mechanism having the above characteristics, and which in addition is compact and small in size.

The present movement, in a general aspect, embodies a claw arm, a rotating driving shaft, an element such as an eccentric or cam on the driving shaft and having a sliding connection with the claw arm whereby the element operates to impart transverse components of motion to the claw arm; and another such element on the driving shaft, and an interconnection between the last element and the claw arm such that longitudinal components of motion are imparted to the claw arm. This arrangement will be seen to be characterized by a separation of the specific operative interconnections that give the respective transverse and longitudinal components of motion to the claw arm, the advantages of this arrangement, however, being left to be explained in the course of the detailed specification that follows.

It will be obvious that while in the specific illustrative embodiment one element is provided on the driving shaft for imparting the transverse oscillative components of motion to the drive shaft and a separate element is provided on the driving shaft for imparting the longitudinal in and out components of motion to the claw arm, these elements may, by giving proper regard to the relationships of the two interconnections to the claw arm, be combined into one element that operates both of said interconnections. Such a variation, while residing within the broad scope of the present invention and claims, is a part of the subject matter of my application filed on even date herewith and entitled "Film movement", Serial No. 447,296, filed April 25, 1930. Reference is also made to my application filed on even date herewith and entitled "Film movement", Serial No. 447,295, filed April 25, 1930, in which are disclosed specific variations in the movement and film holding mechanism.

A further object of the invention is the provision of improved means for holding the film stationary while the claw arm is out of engagement with the film.

Various additional objects and features of the invention will appear and be more fully understood from the following detailed description of a present preferred embodiment thereof, reference for this purpose being had to the accompanying drawings, in which:

Fig. 7 is a diagrammatical view of the movement illustrating an operative position thereof;

Fig. 8 is a diagrammatical view similar to Fig. 7 but showing another operative position of the movement;

Fig. 9 is a diagram showing the generation of the path of the claw pins and other characteristic motions of the preferred embodiment;

Fig. 9a is an enlargement of a portion of the diagram of Fig. 9;

Fig. 10 is a diagram similar to Fig. 9, but illustrating a variational form of the invention;

Fig. 11 is a diagram similar to Fig. 9, but illustrating proportions varied to give a straighter path for the claw pins on the back stroke;

Fig. 12 is a diagram illustrating characteristics of the back path motion of the claw pins;

Fig. 13 is a diagram similar to Fig. 9, but illustrating another variational form of the invention; and Fig. 14 is a diagram illustrating the use of cams for operating the claw arm and a characteristic motion path obtainable therewith.

Figure 1:
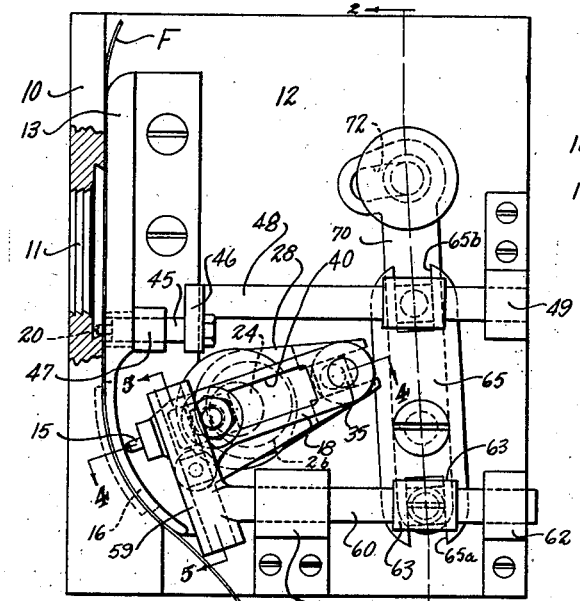
Fig. 1 is a side elevation of the movement showing the claw arm at the mid-point of its return path and the pilot pins engaged with the film.

The mechanism of the invention is adapted to be arranged in a case of any suitable design and construction and may be arranged to cooperate with suitable shutter mechanism and with a suitable arrangement of lenses, etc. For the sake of simplicity, however, the invention is herein set forth independent of any particular casing, shutter mechanism, arrangement of lenses, etc., it being apparent how the mechanism can be incorporated in a suitable design with such units.

Referring now to the drawings, the numeral 10 designates a vertical aperture plate having an exposure aperture 11, and the numeral 12 designates a vertical wall arranged at right angles to and extending rearwardly from an edge of plate 10. Spaced rearwardly from aperture plate 10 and extending from wall 12 is a guide plate 13, between which and the aperture plate is provided the guide way for the film F. The film is moved intermittently in the guide way by the film moving mechanism, later to be described, while during the periods of "dwell", or alternately with the periods of movement or "pull down", the film is engaged by film holding mechanism, which registers the successive film frames $f$ with the exposure aperture 11. The film guide way is vertically disposed except at the lower portion thereof, where it is curved rearwardly to conform to the curvature of motion of the film moving means, now to be described.

The film is advanced by means of film moving pins 15 that extend through vertical slots 16 in plate 13 from the ends of a cross arm 17 arranged at the forward end of a swinging claw arm 18, which is operated to cause its film moving pins to intermittently engage the film perforations $p$ and draw the film downwardly (or upwardly) through successive frame lengths. The film moving pins are of proper size and are so spaced as to fit nicely in the film perforations.

Pilot pins 20, which are also of proper size and shape to fit nicely in the film perforations, are intermittently operated to engage the film alternately with the film moving pins, in such a manner that the pilot pins engage the film perforations $p$ just before the film moving pins are withdrawn therefrom, and are withdrawn from the film just after the film moving pins again engage the film perforations, so that the film is always engaged by one or the other of the pairs of pins.

Figure 6:
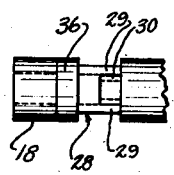
Fig. 6 is a fragmentary detail taken as indicated by line 6—6 of Fig. 4.

The drive shaft for the movement is indicated at 24 (see Fig. 4), journalled in a bearing 25 carried in the wall 12 of the movement. This drive shaft is driven in a right handed direction, as viewed in the aspect of Fig. 1, through any suitable driving arrangement, not shown. Just forwardly of bearing 25 shaft 24 has an eccentric 26, and around this eccentric fits the strap of a rearwardly extending connecting arm 28, the rear end of which has a pair of laterally spaced inward projections 29 (see Fig. 6) providing a longitudinal guide slot within which is taken a guiding slide-block 30 pivotally supported on a stationary stud 31. Stud 31 has an enlarged section 32 providing an outwardly facing annular shoulder 33 against which the edges of the projections 29 ride, this shoulder serving to horizontally position the rear end of the eccentric arm.

The motion of the eccentric arm 28 is thus determined, the driving eccentric 26 imparting both longitudinal and transverse components of motion to the forward end of the arm, but the guide block 30 constraining the rear end of the arm to longitudinal motion.

Pivoted to the rear end of the eccentric arm by means of a pin 35 is the rear end of the claw arm 18, hereinbefore referred to, a flange 36 intermediate the ends of pivot pin 35 serving to space the rear ends of arms 18 and 28. The rear end of eccentric arm 28 then acts to impart longitudinal components of motion to claw arm 18, and other means, now to be described, are provided to impart the proper transverse components of motion to arm 18 so that the arm will describe a path to intermittently engage and pull down the film. Integral with drive shaft 24 and adjacent the outer face of eccentric 26 is a disk 37 that serves to space arms 28 and 18, and carried by this disk is a crank pin 38. This crank pin carries a slider block 39 that works in a longitudinal guide groove 40 provided in the intermediate portion of the claw arm 18, and thus acts to impart transverse components of motion to the claw arm.

The crank pin 38 and the direction of eccentricity of the eccentric 26 are 180 degrees apart with respect to the axis of the drive shaft 24, and the normal direction of rotation of these parts is right handed as viewed in the aspect of Fig. 1.

Figure 4:
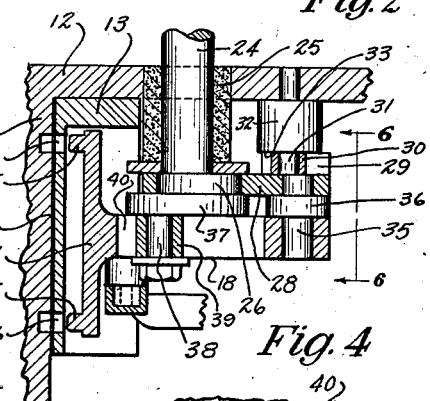
Fig. 4 is a view taken on line 4—4 of Fig. 1.

The operation characteristics of the movement will be better understood from the detailed analysis that follows at a later point in the specification, although it may now be seen that in the position of Figs. 1 and 4 the eccentric arm 28 is in its extreme rearward position so that the claw arm is withdrawn from the film, and that the crank pin is moving upwardly to carry the claw arm through its return path; and that in Fig. 8, in which, for simplicity, the various arms and links are represented by single lines, the eccentric arm 28 is substantially in its extreme forward position so that the pins of the claw arm are in engagement with the film, while the crank pin 38 is moving downwardly to carry the claw arm through its "pull down" stroke.

The film registering or pilot pins 20 extend forwardly from studs 45 carried at the opposite ends of a cross-arm 46, studs 45 having sliding bearing within bushings 47 extending through guide plate 13. Cross-arm 46 is carried on the forward end of a slide rod 48, the rear end of which is taken in a slide bearing 49. There is then provided an operative connection between rod 48 and the claw arm, such that the pilot pins are operated by the claw arm to engage the film just before the film moving pins are removed therefrom, and to withdraw from the film just after the film moving pins again engage the film.

The preferred means for accomplishing this end are embodied as follows: The claw arm 18 has near its forward end a depending boss 54 (see Fig. 5) that carries a stud 55, the outer end of this stud having a pin 56 on which is pivoted a slider-block 57, this block working in the guide groove 58 of a follower bar 59. Bar 59 is formed on the end of a slide rod 60 supported in suitable slide bearings 61 and 62. Integral with rod 60 and extending inwardly therefrom is a bar 63, the inner end of which pivotally carries a slide-block 64 taken by the lower bifurcated end 65a of a lever 65 pivoted intermediate its ends upon a supporting post 66. The upper end 65b of the lever 65 is bifurcated to take a slide-block 68 pivoted to a squared section of the pilot pin operating slide-rod 48.

The guide groove 58 of follower bar 59 is disposed in a line transverse to the longitudinal axis of the claw arm, and the follower will therefore follow the longitudinal components of motion of the claw arm, but not the transverse components of motion thereof.

Figure 5:
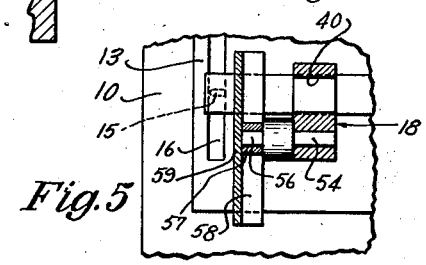
Fig. 5 is a fragmentary detail section taken on line 5—5 of Fig. 1.

The description will be facilitated by now referring, in addition to Figs. 1 and 5, to the diagrams of Figs. 7 and 8, in which the various arms and links are represented for simplicity by single lines. Considering first the diagram of Fig. 7, it will be understood that the claw arm 18 has been moved upwardly through its return path, having been elevated by the crank pin 38 working in its longitudinal guide groove 40, and has just moved into engagement with the film F. In these diagrams the circle $e$ is the circle of eccentricity of the eccentric 26, or in other words the path of the equivalent crank.

During that part of the stroke illustrated in Fig. 1 the point on the claw arm at which the slide block 57 is located is moving very nearly in the straight line of the guide groove of the follower bar, and since this is true the slide block merely moves in the groove of the follower and substantially no movement is imparted to the follower and to the pilot pins linked thereto, which are at that time in engagement with the film. This feature is of great importance and advantage for the reasons, first, that the pilot pins (which are ordinarily, though not necessarily, utilized for holding the film) do not continuously saw on the edges of the film perforations during the periods of dwell, second, that by reason of the film holding means standing in stationary engagement with the film there is provided increased assuredness that the film will not be moved during exposure, and third, that since the film holding means does not move while in engagement with the film, such means may be embodied in forms other than as pilot pins which actually enter the film, such, for instance, as pressure plates.

When, however, the parts reach the position of Fig. 7, the eccentric arm 28 is acting quickly to advance the claw arm 18 into full engagement with the film, and the longitudinal movement which the claw arm then has causes the follower 59 to be advanced and to act through rod 60 to pivot the lever 65, which acts in turn to withdraw rod 48 to withdraw the pilot pins from the film. The parts are so proportioned that the pilot pins leave the film just after the film moving pins of the claw arm engage the film—in Fig. 7 the film moving pins have already entered the film while the pilot pins have not yet completely left the film.

The parts then pass on through the position illustrated in the diagram of Fig. 8 to the lower end of the pull down stroke, when the arm 18 is pulled rearwardly and accordingly acts through its slider-block 57 to move the follower 59 rearwardly and thereby shift the linkage 60, 65 and 48 to again engage the pilot pins with the film, which occurs just before the film moving pins leave the film, as will now be understood.

Figure 2:
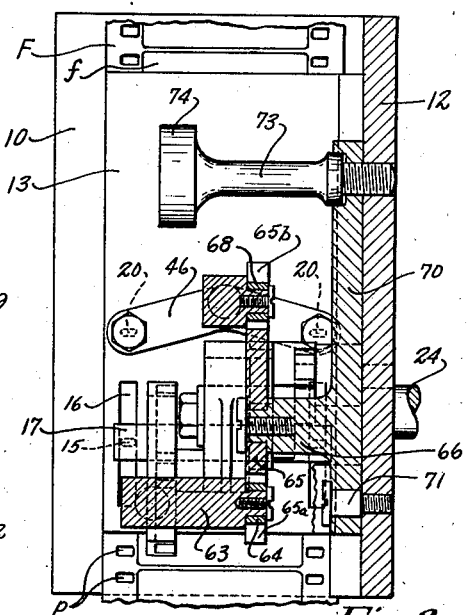
Fig. 2 is a section taken on line 2—2 of Fig. 1.
Figure 3:
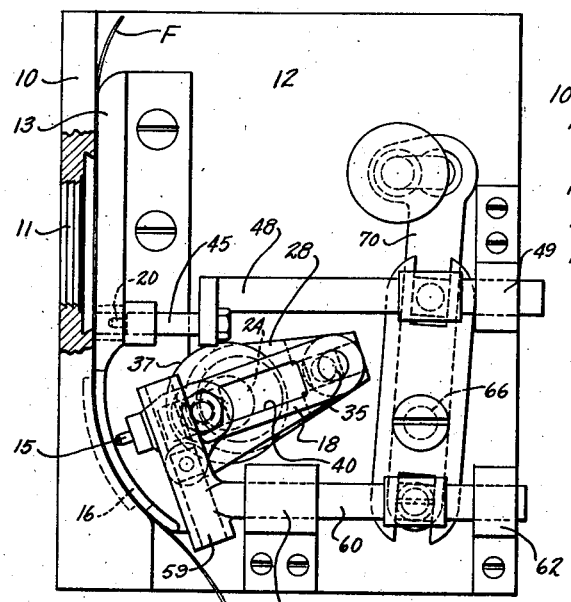
Fig. 3 is a view similar to Fig. 1, but showing the pilot pins withdrawn from the film to thread the movement.

Since the film is always normally engaged by either the film moving or the film holding means, provision is made for withdrawing the film holding or pilot pins from film engaging position when the film moving pins are also removed from film engaging position, so that the film can be threaded through the movement. For this purpose, the post 66 upon which the lever 65 is pivoted, is mounted upon a carrier plate 70 pivoted to the frame plate at 71 (see Fig. 2), and having an arcuate slot 72 at its upper end through which passes a clamping screw 73 that screw threads into plate 12, screw 73 having a thumb piece 74 for manual operation. Thus, the film moving pins being out of film engaging position, as in Fig. 1, screw 73 is loosened and plate 70 swung rearwardly to the position of Fig 3, this action carrying post 66 rearwardly, which in turn acts to swing lever 65 rearwardly and thereby operates rod 48 to withdraw the pilot pins, all as clearly shown in Fig. 3. This general arrangement for allowing the movement to be threaded is disclosed in the co-pending application of Edmund Lindgren and myself entitled "Kinetograph movement", Ser. No. 384,013, filed August 7, 1929.

Fig. 9 is a diagram showing the generation of the path of the film moving pins. The circle $c$ is the path of the crank pin 38 and the circle $e$ is the circle of eccentricity of the eccentric 26, or the path of the equivalent crank, the broken line A—A being the axis of symmetry of the movement. Starting with the position in which the claw arm is disengaged from the film and is at the midpoint of its return path, or in coincidence with axis A—A, successive positions are taken at 30 degree intervals of the crank and eccentric circles $c$ and $e$. The arms 28 and 18 are shown in the diagram only for a position in which the claw arm is just entering the film, although the positions assumed by the forward end of the claw arm and by the pin 35 that pivotally connects the claw arm with the eccentric arm are marked for each 30 degree interval. The fixed pivot point on which the eccentric arm slides and pivots is indicated at $p$, being, in the present instance, located intermediate the end positions of the pivotal connection pin 35 of the eccentric and claw arms.

It will be noted that the claw arm is in engagement with the film approximately between the 110 and 250 degree positions, and that the pull down is therefore of about 140 degrees duration. It will be seen from Fig. 9 that the pull down occurs between the full line position of the arms in the diagram and the dotted line position of the claw arm, indicated at 18', these two positions being those in which the claw arm 18 is tangent to the circle $c$. The period of pull down is therefore represented by the arc on the back side of circle $c$ included between these tangents, and the shorter this arc is made the shorter, of course, will be the period of pull down. In a well known prior type of movement the crank, or its equivalent, rotates in the opposite direction, and the pull down occurs during the longer front-side arc between the tangent lines, which gives a much slower pull down; and it is thus one of the important advantages of my movement that the pull down takes place during the short back-arc, with the resultant shorter period of pull down and longer period of dwell.

The pivotal connection pin 35 of the claw and eccentric arms will be seen to describe a horizontal figure 8 (see Fig. 9a), crossing the axis of movement at the fixed pivot $p$ on which the eccentric arm slides. This figure 8 is so flat as to be nearly a straight line, and has comparatively small effect upon the transverse oscillation of the claw pins. It will be noted, however, that the pin 35 lowers slightly just as the claw arm is engaging the film, and that this effect, coming just as the crank pin 38 is starting to lower the whole claw arm by acting near its middle, tends to swing the forward end of the claw arm upwardly and thereby to flatten out the path of the claw pins as they enter the film.

In Fig. 10 is shown a diagram of a movement in which the fixed pivot $p$ is to the rear of the path of motion of the pivotal connection pin 35 of the two arms. In this case the pivotal connection pin 35 describes a loop, which is below the axis during the period in which the claw arm moves through the last half of its upward return path and during the first half of the pull down, and is above the axis for the opposite half of the cycle. This characteristic has two beneficial effects on the motion: First, the slight dropping of the rear end of the claw arm causes the forward end thereof to move more nearly in a vertical path on its upward or return stroke, with the result of less motion given to the pilot pin mechanism during that period, and second, the displacement of the rear end of the claw arm, first downward and then upward, causes the arc of circle $c$ included between the tangents thereto to be shortened, with a resultant slightly shorter pull down period, as will be clearly understood without further detailed explanation. The back movement line of either Figs. 9 and 10 is nearly a straight line; and that straight line movement, rather than a looping movement, is always desirable because of shortening of the claw path and reduction of the velocity of moving parts.

If the fixed pivot point is, on the other hand, located inside (to the left of) of the path of the pivotal connection of the arms, the loop-path of that connection will be reversed with respect to the axis, as will be readily understood.

It will be noted that in these diagrams the "throw", or diameter "$d$" of the path of motion of the claw pins on the forward end of the claw arm, is equal to the diameter of the eccentric circle $e$. Now the diameter of this eccentric circle controls the shape of the back path of the claw pins, the back path straightening out from convex and then becoming concave as the eccentric circle is made smaller. In Fig. 11 the eccentric circle is made smaller in diameter to give a substantially straight path on the back stroke, but the smaller "throw" that results may render such proportioning objectionable. The best design in practice is one that produces as straight a back path as possible (so that the pilot pins will not move appreciably while engaged with the film), while retaining sufficient throw to insure positive insertion and withdrawal of the claw pins.

The motion of the claw arm on its back path depends also upon the length of the claw arm, or the point on the claw arm selected for reference, as is demonstrated in the diagram of Fig. 12. The horizontal line AO represents the claw arm, and A, B, and C represent selected points thereon. Let the arm be moved so that point O moves horizontally to O', and so that point B moves in a straight vertical line to point B'. Now since A'B' is equal to AB, and A'B' is at an angle with relation to AB, the point A' is displaced to the right from the vertical line drawn through point A, and the end of the line AO therefore moved through a concave path to reach the point A'. And by a similar line of reasoning it will also be seen that point C passes through a convex path to reach point C'. The ideal design of a claw arm, in this respect, is one in which the point B is the point of connection with the pilot pin mechanism. In the present embodiment the back path of the end of the claw arm is made nearly straight, and the point of connection of the claw arm with the pilot pin mechanism follows a slightly convex arc, though one which for all practical purposes may be considered as a straight line.

In the previously described forms, there is provided a fixed pivot pin on the frame and a longitudinal guide groove on the eccentric arm. These relations may, however, be reversed, and the diagram of Fig. 13 shows the movement path when the pivot pin is on the eccentric arm and the guide groove is fixed in position. The motion path of the claw arm is not substantially different from the cases above described.

In the preferred illustrative embodiment, an eccentric is provided for oscillating the arm 28, and a crank for operating on the claw arm 18. These specific elements are selected, preferably, for convenience and simplicity in design, and manufacture, and the invention is not to be limited to one or the other in either situation. Broadly speaking, cranks or eccentrics, which are of the same fundamental nature and therefore can both plainly be covered by using the expression eccentrics, are designed to give an irregular oscillation to the extent that harmonic motion is irregular. Cams, which may be used in the present movement, as will presently be explained, are designed to give a motion that may be still more irregular than harmonic. For the purpose of this description, and within the purview of this invention, in the broadest sense, at least, I prefer to use the word eccentric to include within its broadest meaning not only eccentrics and cranks, but also rotational cams. Thus, while in its broadest aspect I conceive my invention to use either that element which is ordinarily known as an eccentric or a crank, or that which is ordinarily known as a cam, yet in some of its more specific aspects my invention relates to the use of harmonic motion elements, or in other words to the use of eccentrics or cranks in which only circular bearing surfaces are involved. Consequently in the following claims I designate the last under the term circular eccentrics.

In Fig. 14 is shown a diagram of a movement in which two opposed cams are employed, one cam, designated at $k$, working in a horizontal frame provided in the claw arm 18" and operating on the arm to impart vertical components of motion thereto, and the other cam, designated at $h$, working a vertical frame of a horizontally slidable arm 28" which is connected at its rear end to the claw arm to give the longitudinal components of motion thereto. The motion path of the forward end of the claw arm is in the case characterized by a flat or straight line movement toward and away from the film for the insertion and withdrawal of the claw pins, as well as a faster pull down and a longer dwell for the film.

Other designs combining one cam, such as shown in Fig. 14, with one circular eccentric or crank, such as shown in the other diagrams, may of course be carried out; and by so doing desired characteristics of each type of motion path may be combined in one movement.

It will be understood the drawings and description are to be considered merely as illustrative of and not restrictive on the broader claims appended hereto, for various changes in design, structure and arrangement may be made without departing from the spirit and scope of said claims.

I claim:—

1. In a film movement, the combination of a frame providing a film guide way, a film moving claw arm, means for imparting to said arm intermittent film engaging and moving motion such that a point on said arm moves substantially in a straight line transversely of the claw arm during the motion of the arm while out of film engagement, film engaging means operable alternately with the claw arm to hold the film against movement, and motion transmitting means between said last mentioned means and the claw arm including a follower transversely slidable on said claw arm at said point of transverse straight line movement.

2. In a film movement, the combination of a frame providing a film guide way, a film moving claw arm, means for imparting to said arm intermittent film engaging and moving motion such that a point on said arm moves substantially in a straight line transversely of the claw arm during the motion of the arm while out of film engagement, film engaging means operable alternately with the claw arm to hold the film against movement, said means including a follower having a connection with the claw arm transversely slidable thereon at said point of straight line movement, such that substantially only the longitudinal components of the claw arm act to move the follower, and a film engageable member mounted to move toward and away from the film and operatively connected to said follower.

3. In a film movement, the combination of a frame providing a film guideway, a film moving claw arm, means for imparting to said arm intermittent film engaging and moving motion such that a point on said arm moves substantially in a straight line transversely of the claw arm during the motion of the arm while out of film engagement, film engaging means operable alternately with the claw arm to hold the film against movement, said means including a follower member, a connection between said claw arm and said point of straight line movement and said follower, said connection including a slider on one of said connected members and a slider guide disposed transversely to the claw arm on the other of said members, and a film engageable member mounted to move toward and away from the film and operatively connected to said follower member.

4. In a film movement, the combination of a frame providing a film guide way, a claw arm slidingly pivoted, an eccentric connected with the sliding pivot of the claw arm to give the claw arm movement to and from the film, another eccentric operating in synchronism with the first eccentric and operating on the claw arm to oscillate it about its pivot, all in such a manner that a point on said arm moves substantially in a straight line transversely of the claw arm during the motion of the arm while out of film engagement, film engaging means operable alternately with the claw arm to hold the film against movement, and motion transmitting means between said last mentioned means and the claw arm including a follower transversely slidable on said claw arm at said point of transverse straight line movement.

5. In a film movement, the combination of a frame providing a film guide way, a claw arm slidingly pivoted, an eccentric connected with the sliding pivot of the claw arm to give the claw arm movement to and from the film, another eccentric operating in synchronism with the first eccentric and operating on the claw arm to oscillate it about its pivot, all in such a manner that a point on said arm moves substantially in a straight line transversely of the claw arm during the motion of the arm while out of film engagement, and means operable alternately with the claw arm to hold the film against movement, said means including a follower having a connection with the claw arm transversely slidable thereon at said point of straight line movement such that substantially only the longitudinal components of the claw arm act to move the follower, and a film engageable member mounted to move toward and away from the film and operatively connected to said follower.

6. In a film movement, the combination of a frame providing a film guide way, a claw arm slidingly pivoted, an eccentric connected with the sliding pivot of the claw arm to give the claw arm movement to and from the film, another eccentric operating in synchronism with the first eccentric and operating on the claw arm to oscillate it about its pivot, all in such a manner that a point on said arm moves substantially in a straight line transversely of the claw arm during the motion of the arm while out of film engagement, and means operable alternately with the claw arm to hold the film against movement, said means including a follower member, a connection between said claw arm at the point of straight line movement and said follower, said connection including a slider on one of said connected members and a slider guide disposed transversely to the claw arm on the other of said members, and a film engageable member mounted to move toward and away from the film and operatively connected to said follower member.

7. In a film movement, the combination of intermittent film engaging and moving mechanism, said mechanism including a pivoted oscillative arm having a point that moves substantially in a straight line during the operation of the mechanism while out of film engagement, film holding means operable alternately with the film moving mechanism to hold the film stationary, and operative connective means between said film holding means and the film moving mechanism, said means including a follower, and slidable connective means between said follower and said oscillative arm at said point of straight line movement, said means slidable in the direction of said straight line movement but operative to cause movement of the connective means during movement of said point on the oscillative arm at right angles to the direction of said straight line movement.

8. In a film movement, the combination of a film guideway, an oscillating operating arm extending substantially at right angles to said guideway, a claw arm having a forward film engaging end and extending substantially at right angles to the guideway to a rear end which is pivotally mounted on an end of the operating arm to swing with reference thereto, a slide-pivot mounting for the pivoted ends of said arms, an eccentric acting on the operating arm to oscillate it and the claw arm longitudinally toward and away from the guideway, and another eccentric acting on the claw arm to oscillate it about its pivot and move its forward end along the guide way.

9. In a film movement, the combination of a film guideway, an oscillating operating arm extending substantially at right angles to said guideway, a claw arm having a forward film engaging end and extending substantially at right angles to the guideway to a rear end which is pivotally mounted on the rear end of the operating arm to swing with reference thereto, a slide pivot mounting for the pivoted ends of said arms, a single operating shaft, an eccentric on said shaft acting on the operating arm to oscillate it and the claw arm longitudinally toward and away from the guideway, and another eccentric on said operating shaft diametrically opposed to the first mentioned eccentric and acting on the claw arm to oscillate it about its pivot and move its forward end along the guideway.

10. In a film movement, the combination of a film guideway, an oscillating operating arm extending substantially at right angles to said guideway, a claw arm having a forward film engaging end and extending substantially at right angles to the guideway to a rear end which is pivotally mounted on the rear end of the operating arm to swing with reference thereto, a slide pivot mounting for the rear end of one of said arms, a single operating shaft disposed transversely to and intermediate the ends of said arms, an eccentric on said shaft acting on the operating arm to oscillate it and the claw arm longitudinally toward and away from the guideway, another eccentric on said operating shaft diametrically opposed to the first mentioned eccentric, and a connection between the last mentioned eccentric and an intermediate portion of the claw arm longitudinally slidable on the claw arm, whereby the claw arm is oscillated about its pivot and its forward end is moved along the guideway.

11. In a film movement, the combination of a film guideway, an oscillating operating arm extending substantially at right angles to said guideway, a claw arm having a forward film engaging end and extending substantially at right angles to the guideway to a rear end which is pivotally mounted on the rear end of the operating arm to swing with reference thereto, a slide pivot mounting for the rear end of one of said arms, a single operating shaft disposed transversely to and intermediate the ends of said arms, an eccentric on said shaft acting on the operating arm to oscillate it and the claw arm longitudinally toward and away from the guideway, another eccentric on said operating shaft diametrically opposed to the first mentioned eccentric, and said claw arm having in its intermediate portion a longitudinal guide slot wherein said eccentric works whereby the claw arm is oscillated about its pivot and its forward end is moved along the guideway.

In witness that I claim the foregoing I have hereunto subscribed my name this 19th day of March, 1930.

GEORGE A. MITCHELL.

CERTIFICATE OF CORRECTION.

Patent No. 1,849,880.  Granted March 15, 1932, to

GEORGE A. MITCHELL.

It is hereby certified that error appears in the printed specification of the above numbered patent requiring correction as follows: Page 6, line 67, claim 3, for the word "and" read at; and that the said Letters Patent should be read with this correction therein that the same may conform to the record of the case in the Patent Office.

Signed and sealed this 26th day of April, A. D. 1932.

(Seal)

M. J. Moore,
Acting Commissioner of Patents.